United States Patent
Harwood et al.

(10) Patent No.: US 10,275,078 B1
(45) Date of Patent: Apr. 30, 2019

(54) SPLIT RESISTIVE TOUCH SENSOR

(71) Applicant: Rockwell Collins, Inc., Cedar Rapids, IA (US)

(72) Inventors: Craig E. Harwood, Cedar Rapids, IA (US); Donald E. Mosier, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 296 days.

(21) Appl. No.: 15/464,008

(22) Filed: Mar. 20, 2017

(51) Int. Cl.
*G06F 3/045* (2006.01)
*G06F 3/041* (2006.01)

(52) U.S. Cl.
CPC ............ *G06F 3/0416* (2013.01); *G06F 3/045* (2013.01)

(58) Field of Classification Search
CPC .................. G06F 3/03545; G06F 3/045; G06F 2203/04808; G06F 2203/04803; G06F 3/0416
See application file for complete search history.

(56) References Cited

U.S. PATENT DOCUMENTS

| | | | | |
|---|---|---|---|---|
| 2001/0013861 A1* | 8/2001 | Shimizu | .................. | G06F 3/045 345/173 |
| 2010/0079389 A1* | 4/2010 | Liu | ........................ | G06F 3/0416 345/173 |
| 2011/0234508 A1* | 9/2011 | Oda | ........................ | G06F 3/044 345/173 |
| 2012/0229413 A1* | 9/2012 | Fang | ..................... | G06F 3/0416 345/174 |
| 2014/0346029 A1* | 11/2014 | Sekizawa | ................ | G06F 3/044 200/600 |

* cited by examiner

*Primary Examiner* — Stacy Khoo
(74) *Attorney, Agent, or Firm* — Angel N. Gerdzhikov; Donna P. Suchy; Daniel M. Barbieri

(57) ABSTRACT

Touch sensors with multiple electrically isolated touch regions are disclosed. A touch sensor may include a first substrate and a second substrate. The first substrate may include two or more resistive layers covering two or more separate areas. The second substrate may include a continuous resistive layer that partially overlaps with each of the two resistive layers of the first substrate. The touch sensor may also include a first controller electrically connected to the continuous resistive layer of the second substrate and electrically connected to a first one of the two resistive layers of the first substrate, forming a first independently operable region. The touch sensor may further include a second controller electrically connected to the continuous resistive layer of the second substrate and electrically connected to a second one of the two resistive layers of the first substrate, forming a second independently operable region.

20 Claims, 5 Drawing Sheets

SPLIT RESISTIVE TOUCH SENSOR

BACKGROUND

A touch sensor is an electronic device that is capable of receiving user input through single- or multi-touch gestures by touching the sensor with a stylus and/or one or more fingers. There are various types of touch sensors available. Some touch sensors, referred to as resistive touch sensors utilize thinly separated electrically-resistive layers to detect touch gestures. Resistive touch sensors are reliable and are resistant to liquids and other contaminants, making them suitable for operating environments such as restaurants, factories, hospitals, and vehicles. However, currently available resistive touch sensors are not configured to provide the level of redundancy required in certain (e.g., avionics) applications.

SUMMARY

In one aspect, embodiments of the inventive concepts disclosed herein are directed to a touch sensor. The touch sensor may include a first substrate and a second substrate. The first substrate may include two or more resistive layers covering two or more separate areas of the first substrate. The second substrate may include a continuous resistive layer that partially overlaps with each of the two resistive layers of the first substrate. The touch sensor may also include a first controller electrically connected to the continuous resistive layer of the second substrate and electrically connected to a first one of the two resistive layers of the first substrate, forming a first independently operable region electrically isolated from a second one of the two resistive layers of the first substrate. The touch sensor may further include a second controller electrically connected to the continuous resistive layer of the second substrate and electrically connected to the second one of the two resistive layers of the first substrate, forming a second independently operable region electrically isolated from the first one of the two resistive layers of the first substrate.

In a further aspect, embodiments of the inventive concepts disclosed herein are directed to a touch sensor. The touch sensor may include a first substrate and a second substrate. The first substrate may include two or more resistive layers covering two or more separate areas of the first substrate. The second substrate may include a continuous resistive layer that partially overlaps with each of the two resistive layers of the first substrate. The touch sensor may also include a first controller and a second controller. The first controller may be electrically connected to the continuous resistive layer of the second substrate and electrically connected to a first one of the two resistive layers of the first substrate, forming a first independently operable region electrically isolated from a second one of the two resistive layers of the first substrate. The second controller may be electrically connected to the continuous resistive layer of the second substrate and electrically connected to the second one of the two resistive layers of the first substrate, forming a second independently operable region electrically isolated from the first one of the two resistive layers of the first substrate. The touch sensor may further include a coordinator in communication with the first and second controllers. The coordinator may be configured to coordinate access to the continuous resistive layer of the second substrate from the first and second controllers.

In another aspect, embodiments of the inventive concepts disclosed herein are directed to an apparatus. The apparatus may include a display and a touch sensor coupled to the display. The touch sensor may include a first substrate and a second substrate. The first substrate may include two or more resistive layers covering two or more separate areas of the first substrate. The second substrate may include a continuous resistive layer that partially overlaps with each of the two resistive layers of the first substrate. The touch sensor may also include a first controller electrically connected to the continuous resistive layer of the second substrate and electrically connected to a first one of the two resistive layers of the first substrate, forming a first independently operable region electrically isolated from a second one of the two resistive layers of the first substrate. The touch sensor may further include a second controller electrically connected to the continuous resistive layer of the second substrate and electrically connected to the second one of the two resistive layers of the first substrate, forming a second independently operable region electrically isolated from the first one of the two resistive layers of the first substrate.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
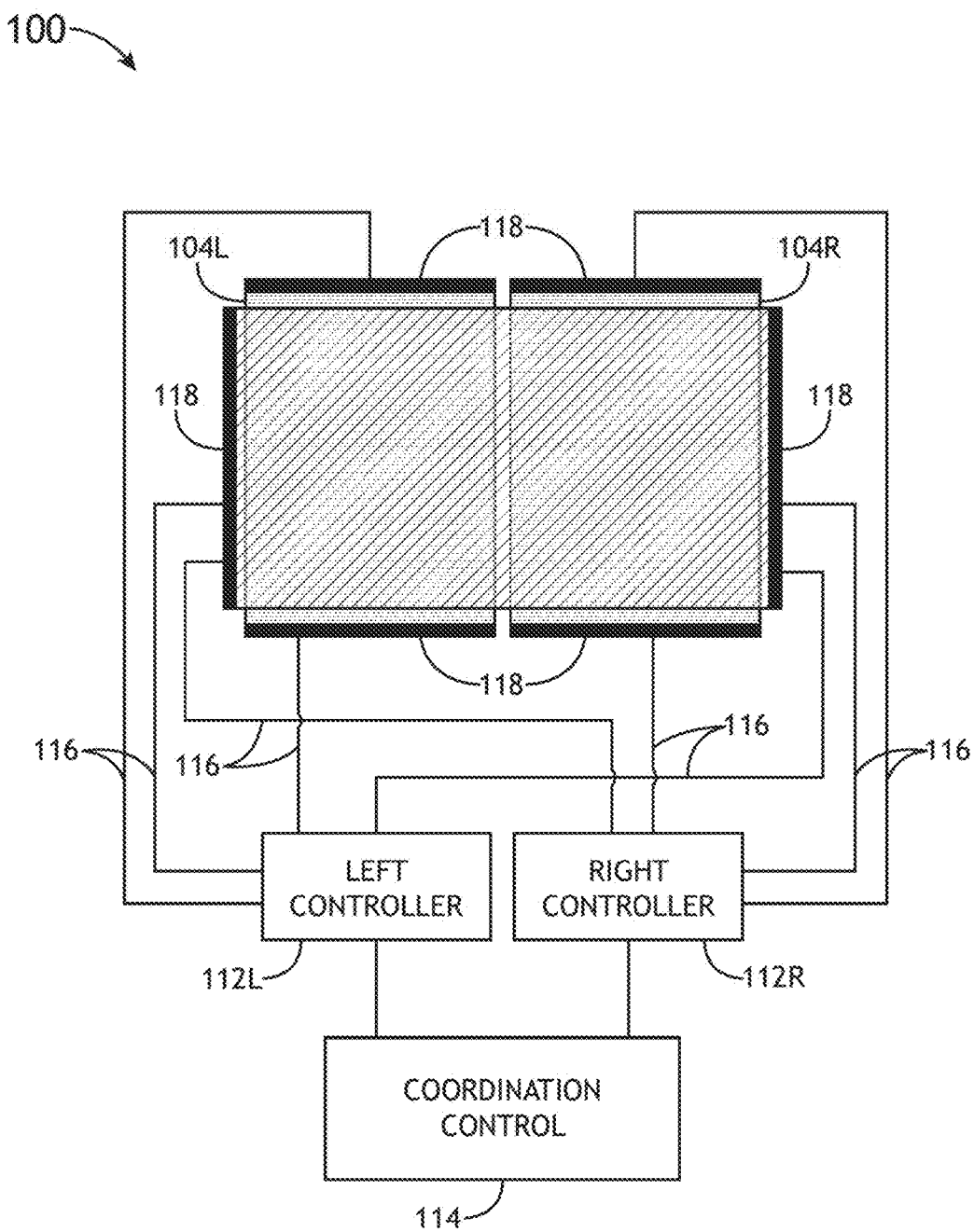
FIG. 1 is a block diagram of an exemplary touch sensor according to an exemplary embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments in accordance with the inventive concepts disclosed herein are directed to resistive touch sensors with multiple electrically isolated touch regions. Touch sensors configured in this manner may be implemented as standalone touch sensing devices, or as components of devices such as electronic displays/screens or the like. By providing a touch sensor with multiple electrically isolated touch regions, a failure in one region of the touch sensor does not impair operations in other region(s) of the same touch sensor, allowing the touch sensor to be utilized in an operating environment that may require true redundancy.

Figure 2:
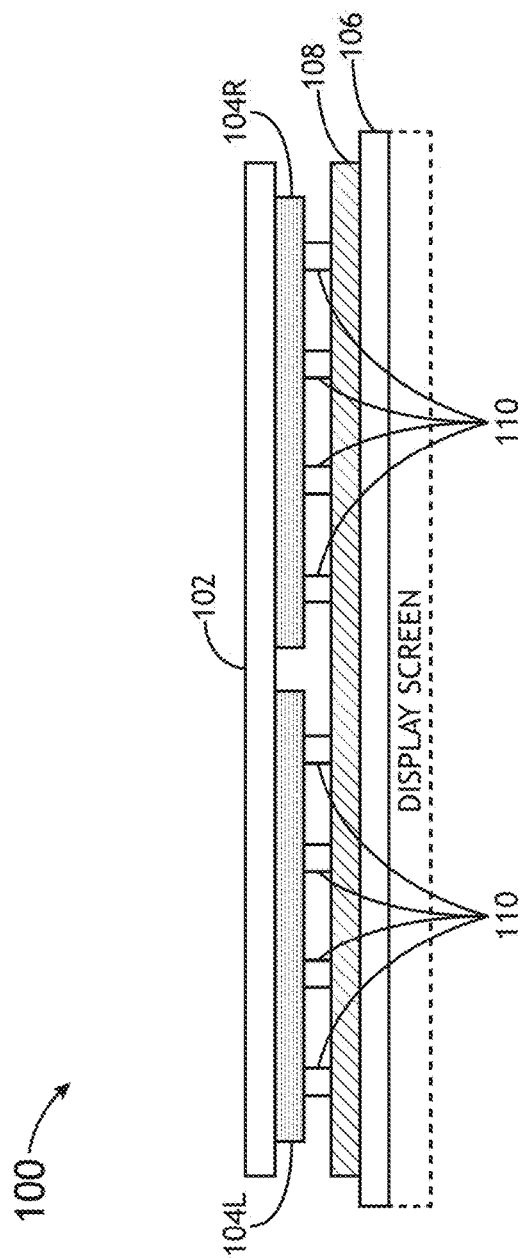
FIG. 2 is a simplified cross-sectional view of an exemplary touch sensor according to an exemplary embodiment of the inventive concepts disclosed herein.
Figure 3:
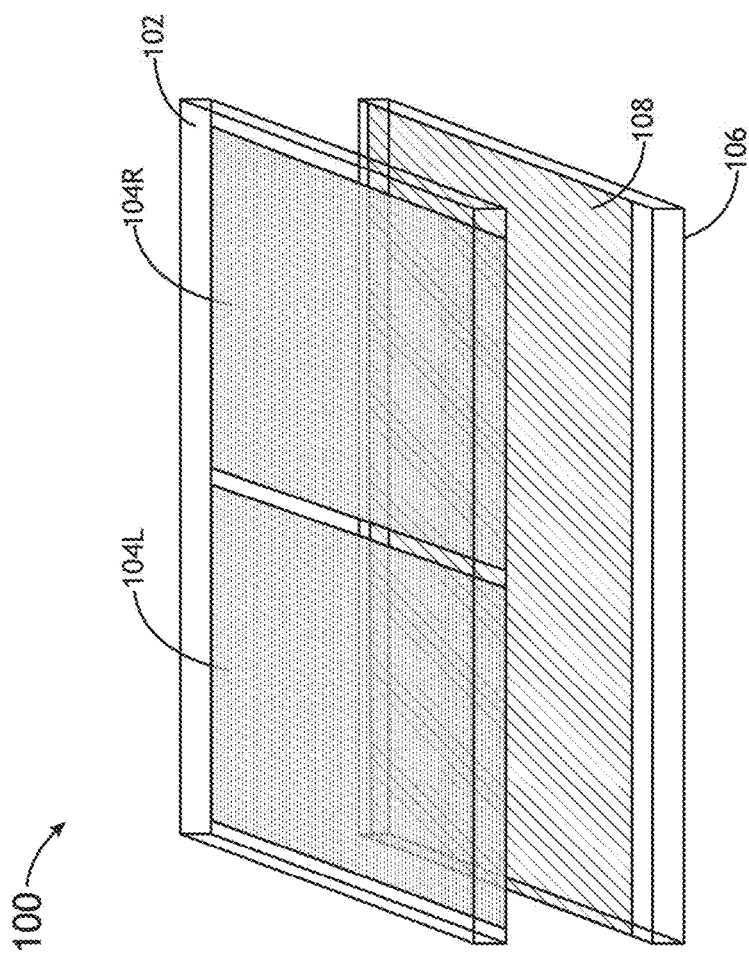
FIG. 3 is a simplified isometric view of an exemplary touch sensor according to an exemplary embodiment of the inventive concepts disclosed herein.

Referring generally to FIGS. 1-3. FIG. 1 is a block diagram depicting an exemplary touch sensor 100 configured in accordance with an embodiment of the inventive concepts disclosed herein. FIG. 2 is a simplified cross-sectional view of the touch sensor 100, and FIG. 3 is a simplified isometric view of the touch sensor 100. As shown in FIGS. 1-3, the touch sensor 100 may include a first substrate 102 and a second substrate 106. The first substrate 102 may be a flexible substrate that includes two or more resistive layers (e.g., indium tin oxide, or ITO, coatings) 104L and 104R covering two or more separate areas of the first substrate 102. The second substrate 106 may be a rigid substrate that is covered by a continuous resistive layer (e.g., ITO coating) 108.

The resistive layers 104L and 104R covering the first substrate 102 and the resistive layer 108 covering the second substrate 106 are configured to face each other so that both resistive layers 104L and 104R at least partially overlap with the resistive layer 108. It is noted that one or more spacers 110 may be utilized to separate the resistive layers 104L and 104R from the resistive layer 108. The spacers 110 may be configured to be compliant, allowing the first substrate 102 to displace toward the second substrate 106 when touched. In this manner, as the first substrate 102 is pressed toward the second substrate 106, a contact can be established between one of the resistive layers 104 and the resistive layer 108. Depending on whether the contact is established between the resistive layer 104L and the resistive layer 108 or between the resistive layer 104R and the resistive layer 108, a corresponding controller 112L or a corresponding controller 112R may be engaged to determine the position of the contact.

Figure 4:
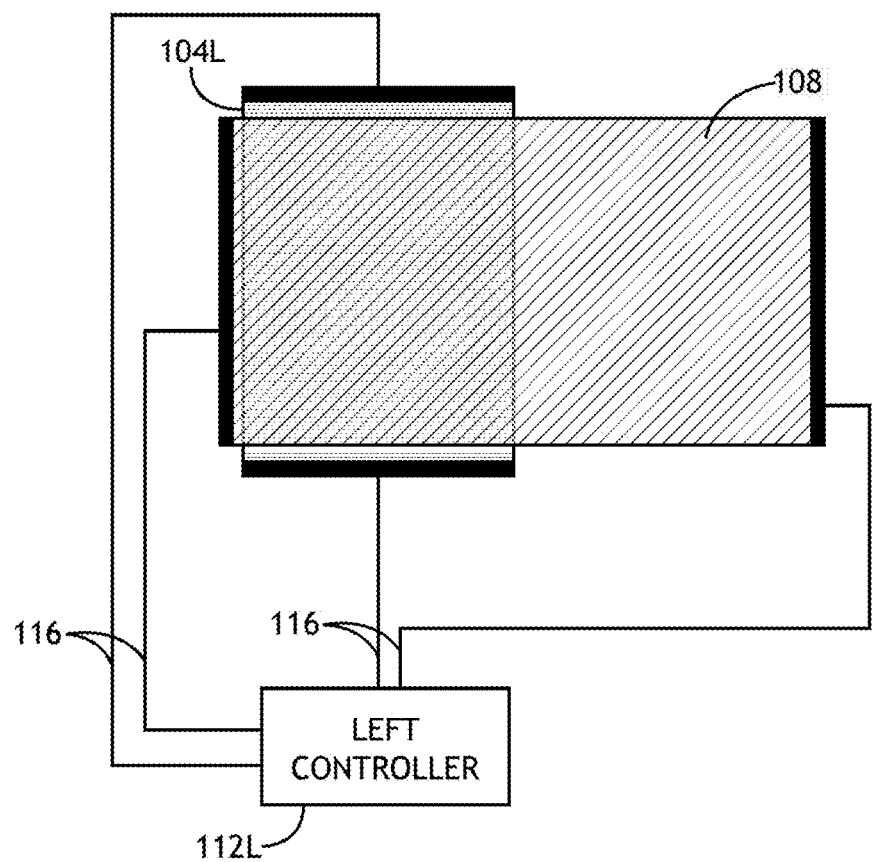
FIG. 4 is an illustration depicting one particular touch region of an exemplary touch sensor according to an exemplary embodiment of the inventive concepts disclosed herein.

For example, suppose that a contact is established between the resistive layer 104L and the resistive layer 108. Because the resistive layer 104L is only electrically connected to the controller 112L (via sensor wires 116 and conductive bars 118), the resistive layer 104L is effectively isolated from the other controller 112R, and the other controller 112R is not involved in this process and can be temporarily ignored for illustrative purposes. Effectively, the result is an independently operable 4-wire resistive touch sensor shown in FIG. 4, and it is contemplated that various techniques available for determining X and Y coordinates of the position of the contact can be utilized to determine the position in question without departing from the broad scope of the inventive concepts disclosed herein. It is also contemplated that the position of a contact between the resistive layer 104R and the resistive layer 108 may be determined by the controller 112R in a similar manner.

It is further contemplated that the touch sensor 100 may include a coordinator 114 configured to coordinate the operations of the controllers 112L and 112R (which may be implemented as dedicated processing units, application-specific integrated circuits (ASICs), field-programmable gate arrays (FPGAs) or various other types of processors or processing units). It is noted that because the controllers 112 may need to share the use of the resistive layer 108, it may be necessary to schedule their use of the resistive layer 108 in a manner that will avoid conflict. In some embodiments, the coordinator 114 may be configured to function as a scheduler that controls when each controller 112 may use the resistive layer 108. Additionally and/or alternatively, the coordinator 114 may be configured to facilitate communications between the controllers 112. It is to be understood that while the coordinator 114 is depicted as a separate component from the controllers 112, such a configuration is merely exemplary and is not meant to be limiting. It is contemplated that the coordinator 114 may be implemented as integrated parts of the controllers 112. The controllers 112 may, for example, implement a handshaking protocol to facilitate coordination between them. Alternatively, one of the controllers 112 may be elected to serve as a master, which may carry out the coordination functions as described above.

Figure 5:
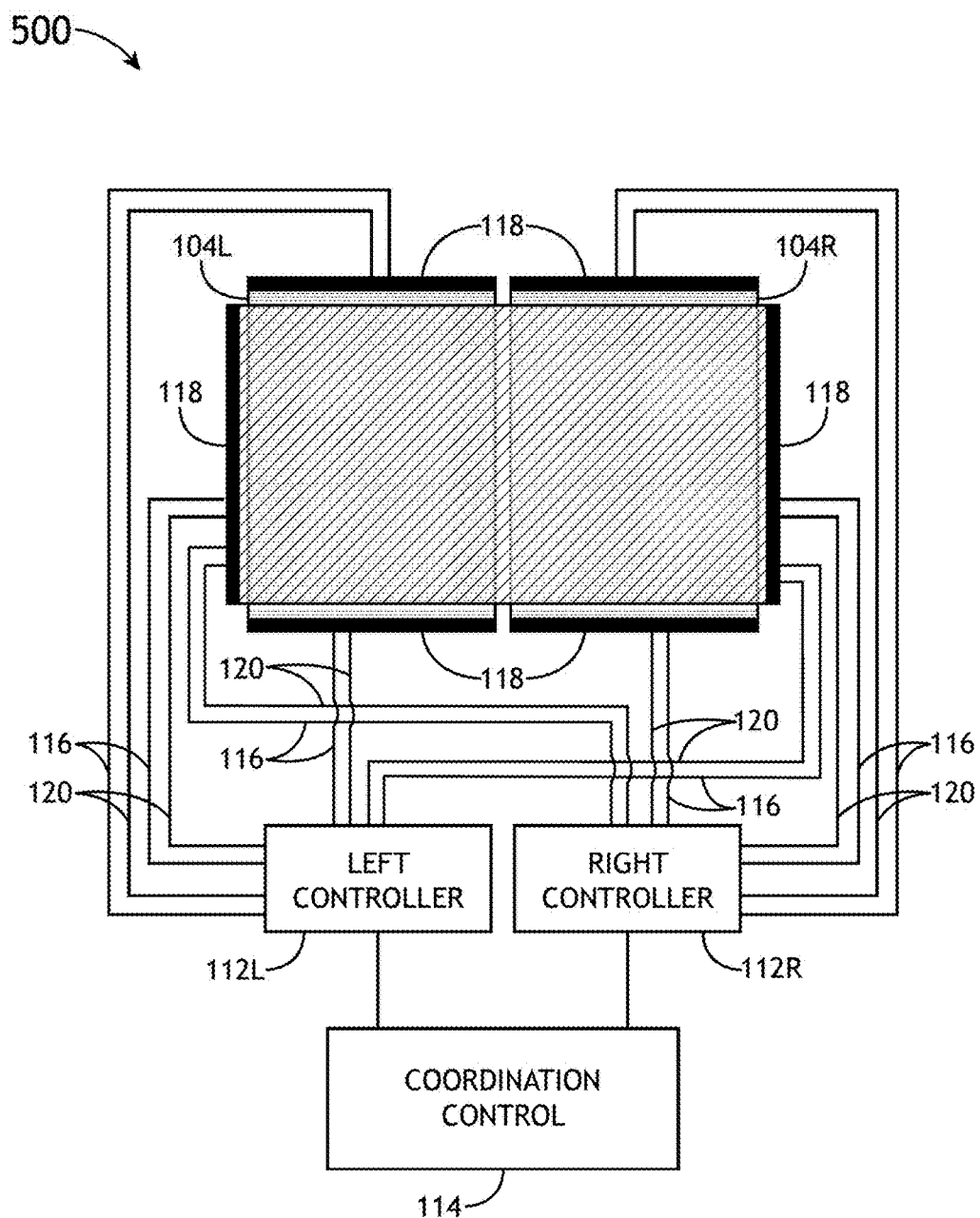
FIG. 5 is a block diagram of an exemplary touch sensor according to an exemplary embodiment of the inventive concepts disclosed herein.

Referring now to FIG. 5, a block diagram depicting an exemplary touch sensor 500 configured in accordance with an embodiment of the inventive concepts disclosed herein is shown. The touch sensor 500 is similar to the touch sensor 100 previously described, but additional sense wires 120 are added to provide a second connection between the controllers 112 and their corresponding conductive bars 118. It is noted that the addition of these sense wires 120 effectively forms two 8-wire resistive touch regions within the touch sensor 500, which may allow voltage offsets created by the wiring or drive circuitry to be calibrated out during operation (therefore provide improve detection accuracy).

It is to be understood that while the examples depicted above referenced the touch regions as left and right regions, such examples are merely presented for illustrative purposes and are not meant to be limiting. It is contemplated that touch sensors configured in accordance with embodiments of the inventive concepts disclosed herein may be separated into various number of regions in various manners without departing from the broad scope of the inventive concepts disclosed herein.

As will be appreciated from the above, touch sensors configured in accordance with embodiments of the inventive concepts disclosed herein are capable of not only providing full support for touch functions during normal operations (with invisible separation between the two halves of the touch sensor), but also providing true redundancies when needed. For instance, if one side of the touch sensor fails to operate properly, that failure does not impair operations of the other side of the touch sensor. Touch sensors configured in accordance with embodiments of the inventive concepts disclosed herein also use less wires comparing to digital touch screens. It is noted that a digital touch screen of a comparable size may require over 120 connections; a resistive touch sensor configured in accordance with embodiments of the inventive concepts disclosed herein, on the other hand, may use 16 or fewer.

It is contemplated that touch sensors configured in accordance with embodiments of the inventive concepts disclosed herein may be implemented as standalone touch sensing devices, or as components of devices such as electronic displays or the like. In some embodiments, touch sensors configured in accordance with embodiments of the inventive concepts disclosed herein may be utilized as components of safety critical systems such as flight displays or the like. It is contemplated that touch sensors configured in accordance with embodiments of the inventive concepts disclosed herein may be utilized in various other types of applications without departing from the broad scope of the inventive concepts disclosed herein. For instance, it is contemplated that touch sensors configured in accordance with embodiments of the inventive concepts disclosed herein may be install on various types of mobile platforms and/or vehicles, including land vehicles, watercraft (e.g., ships, boats), aircraft, and spacecraft.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A touch sensor, comprising:
a first substrate, the first substrate comprising at least two resistive layers covering at least two separate areas of the first substrate;
a second substrate, the second substrate comprising a continuous resistive layer that at least partially overlaps with each of the at least two resistive layers of the first substrate;
a first controller electrically connected to the continuous resistive layer of the second substrate and electrically connected to a first one of the at least two resistive layers of the first substrate, forming a first independently operable region electrically isolated from a second one of the at least two resistive layers of the first substrate; and
a second controller electrically connected to the continuous resistive layer of the second substrate and electrically connected to the second one of the at least two resistive layers of the first substrate, forming a second independently operable region electrically isolated from the first one of the at least two resistive layers of the first substrate.

2. The touch sensor of claim 1, wherein the first and second independently operable regions are each configured as a 4-wire resistive touch sensing region.

3. The touch sensor of claim 1, wherein the first and second independently operable regions are each configured as an 8-wire resistive touch sensing region.

4. The touch sensor of claim 1, further comprising:
a coordinator in communication with the first and second controllers, the coordinator configured to coordinate access to the continuous resistive layer of the second substrate from the first and second controllers.

5. The touch sensor of claim 4, wherein the coordinator is an integrated component of the first controller or the second controller.

6. The touch sensor of claim 4, wherein the coordinator is a component of the touch sensor separate from the first and second controllers.

7. The touch sensor of claim 1, wherein the first substrate is a flexible substrate and the second substrate is a rigid substrate.

8. The touch sensor of claim 1, wherein the resistive layers of the first and second substrates comprise indium tin oxide coatings.

9. The touch sensor of claim 1, wherein the touch sensor is implemented as a component of an electronic display.

10. The touch sensor of claim 9, wherein the electronic display is a flight display.

11. A touch sensor, comprising:
a first substrate, the substrate comprising at least two resistive layers covering at least two separate areas of the first substrate;

a second substrate, the second substrate comprising a continuous resistive layer that at least partially overlaps with each of the at least two resistive layers of the first substrate;

a first controller electrically connected to the continuous resistive layer of the second substrate and electrically connected to a first one of the at least two resistive layers of the first substrate, forming a first independently operable region electrically isolated from a second one of the at least two resistive layers of the first substrate;

a second controller electrically connected to the continuous resistive layer of the second substrate and electrically connected to the second one of the at least two resistive layers of the first substrate, forming a second independently operable region electrically isolated from the first one of the at least two resistive layers of the first substrate; and a coordinator in communication with the first and second controllers, the coordinator configured to coordinate access to the continuous resistive layer of the second substrate from the first and second controllers.

12. The touch sensor of claim 11, wherein the first and second independently operable regions are each configured as a 4-wire resistive touch sensing region.

13. The touch sensor of claim 11, wherein the first and second independently operable regions are each configured as an 8-wire resistive touch sensing region.

14. The touch sensor of claim 11, wherein the coordinator is an integrated component of the first controller or the second controller.

15. The touch sensor of claim 11, wherein the coordinator is a component of the touch sensor separate from the first and second controllers.

16. The touch sensor of claim 11, wherein the touch sensor is implemented as a component of an electronic display.

17. The touch sensor of claim 16, wherein the electronic display is a flight display.

18. An apparatus, comprising:

a display; and a touch sensor coupled to the display, the touch sensor comprising:

a first substrate, the substrate comprising at least two resistive layers covering at least two separate areas of the first substrate;

a second substrate, the second substrate comprising a continuous resistive layer that at least partially overlaps with each of the at least two resistive layers of the first substrate;

a first controller electrically connected to the continuous resistive layer of the second substrate and electrically connected to a first one of the at least two resistive layers of the first substrate, forming a first independently operable region electrically isolated from a second one of the at least two resistive layers of the first substrate; and a second controller electrically connected to the continuous resistive layer of the second substrate and electrically connected to the second one of the at least two resistive layers of the first substrate, forming a second independently operable region electrically isolated from the first one of the at least two resistive layers of the first substrate.

19. The apparatus of claim 18, wherein the first and second independently operable regions are each configured as a 4-wire resistive touch sensing region.

20. The apparatus of claim 18, wherein the first and second independently operable regions are each configured as an 8-wire resistive touch sensing region.

\* \* \* \* \*